(12) United States Patent
Cao et al.

(10) Patent No.: US 11,608,867 B1
(45) Date of Patent: Mar. 21, 2023

(54) HIGH-STRENGTH AND HIGH-THERMAL CONDUCTIVITY NEW MATERIAL COMPOSITE BRAKE DRUM AND PREPARATION METHOD THEREOF

(71) Applicant: Shanxi Tangrong Machinery Manufacturing Co., Ltd., Linfen (CN)

(72) Inventors: Quanqing Cao, Shanxi (CN); Hongbin Jin, Shanxi (CN); Xiaoyan Wang, Shanxi (CN); Haiyang Liu, Shanxi (CN)

(73) Assignee: Shanxi Tangrong Machinery Manufacturing Co., Ltd., Shanxi (CN)

(*) Notice: Subject to any disclaimer, the term of this patent is extended or adjusted under 35 U.S.C. 154(b) by 0 days.

(21) Appl. No.: 17/749,724

(22) Filed: May 20, 2022

(30) Foreign Application Priority Data

Dec. 26, 2021 (CN) .......................... 202111608495.2
Mar. 1, 2022 (CN) .......................... 202210190116.0

(51) Int. Cl.
*F16D 65/10* (2006.01)
*B22D 13/04* (2006.01)
*B22D 19/16* (2006.01)
*B22D 27/02* (2006.01)
*C22C 37/06* (2006.01)
*C22C 37/10* (2006.01)

(52) U.S. Cl.
CPC .............. *F16D 65/10* (2013.01); *B22D 13/04* (2013.01); *B22D 19/16* (2013.01); *B22D 27/02* (2013.01); *C22C 37/06* (2013.01); *C22C 37/10* (2013.01); *F16D 2200/0013* (2013.01); *F16D 2250/0007* (2013.01); *F16D 2250/0046* (2013.01)

(58) Field of Classification Search
None
See application file for complete search history.

(56) References Cited

FOREIGN PATENT DOCUMENTS

| CN | 102191424 A | * | 9/2011 |
| CN | 113458363 A | * | 10/2021 |
| CN | 113481426 A | * | 10/2021 |

* cited by examiner

*Primary Examiner* — Kevin E Yoon
*Assistant Examiner* — Jacky Yuen
(74) *Attorney, Agent, or Firm* — Reising Ethington P.C.

(57) ABSTRACT

The present disclosure discloses a high-strength and high-thermal conductivity new material composite brake drum and a preparation method thereof. The composite brake drum is composed of an outer layer of high-strength ductile iron and an inner layer of high-thermal conductivity gray cast iron, which are integrated by centrifugal compound casting. The outer layer of the composite brake drum is firstly poured on the production line of iron particle-filled coated sand shells. Due to the fast solidification and cooling of the iron particle-filled coated sand shells, the castings have the characteristics of fine and dense organization structures to ensure the high strength and high toughness of the ductile iron of the outer layer. On this basis, the inner gray cast iron is poured under centrifugal casting conditions, in which a good metallurgical bond between the inner and outer layers is achieved by controlling the centrifugal casting process.

7 Claims, 3 Drawing Sheets

HIGH-STRENGTH AND HIGH-THERMAL CONDUCTIVITY NEW MATERIAL COMPOSITE BRAKE DRUM AND PREPARATION METHOD THEREOF

TECHNICAL FIELD

The present disclosure relates to the technical field of automobile parts, and a high-strength and high-thermal conductivity new material composite brake drum and a preparation method thereof.

BACKGROUND ART

Along with the advancement of automobile technology and the improvement of the running speed of the automobile, higher requirements are also put forward for the braking performance of the automobile and the performance of the parts of the corresponding braking system. A brake drum is a critical part in the braking system of an automobile, so its performance directly affects the braking performance and even the safety of the automobile. When the automobile brakes, the brake pad exerts pressure on the inner surface of the brake drum in the radial direction, thus generating circumferential tension. At the same time, due to the kinetic or static friction force generated between the brake pad and the inner surface of the brake drum during braking, tensile stress is generated in the local area of the inner surface of the brake drum. The heat generated by frequent braking causes the temperature of the inner surface of the brake drum to rise sharply, which is followed by rapid cooling due to thermal conduction, thereby generating thermal fatigue stress. Because of its good thermal conductivity, gray cast iron has long been used as the main material for brake drums.

However, there is a large amount of flake graphite with low strength in gray cast iron, so the production of brake drums with a single gray cast iron material is very likely to cause the fracture of materials, thus affecting the safe use of brake drums.

In order to improve the strength and toughness of cast iron brake drums and not affect the thermal conductivity of the material, there are also brake drums made of vermicular graphite cast iron materials. Although various performances of vermicular graphite cast iron brake drums have been improved, vermicular graphite cast iron has disadvantages of poor thermal conductivity, difficulty in process control, large difference in creep rates, and the like. Therefore, slight deviation may result in the formation of ductile iron with worse thermal conductivity or gray iron with very low strength. The instability of the material may lead to the crack of the brake drum easily during use due to thermal fatigue, thereby affecting the safe use of the brake drum.

In recent years, the development of the manufacturing process of brake drums from the composite of gray cast iron and low-carbon steel has attracted extensive attention. The service life of this product has been greatly improved compared with that of the brake drum made of a single gray iron or vermicular iron material, but the products of this structure also have some defects, poor thermal conductivity and rigidity, which causes large deformation of the product, poor dynamic imbalance, long braking distance, abnormal wear of the braking surface and many other problems.

SUMMARY

The present disclosure provides a high-strength and high-thermal conductivity new material composite brake drum and a preparation method thereof.

To achieve the above purposes, the present disclosure provides the following:

The present disclosure provides a high-strength and high-thermal conductivity new material composite brake drum and a preparation method thereof. The high-strength and high-thermal conductivity new material composite brake drum includes an outer layer and an inner layer, the outer layer is made of high-strength ductile iron or vermicular iron, the inner layer is made of low-alloy gray cast iron, and the outer layer and the inner layer are fused together by means of solid-liquid bonding, the preparation method is as below:

1) smelting molten iron, and after the molten iron is melted, adding 1-1.5% by weight of rare-earth ferrosilicon magnesium spheroidizing agent and 0.8-1.3% by weight of ferrosilicon inoculant at the bottom of a ductile iron ladle for spheroidization while keeping the spheroidization temperature at 1560-1650° C.;

pouring the spheroidized molten iron into cavities from a pouring cup at a pouring rate of 15-25 seconds for each cavity while controlling the pouring temperature at 1420-1480° C. for a total pouring period of ≤15 minutes; after the molten iron is completely solidified and when the temperature drops to 950-1000° C., taking it out of the cavities and cooling in air to a temperature of 280-360° C., degating, grinding and cleaning sand to obtain a high-strength ductile iron outer casting of the composite brake drum;

2) placing the outer casting on a centrifuge, adding a compounding agent to a part of an inner surface that needs to be compounded with gray iron, heating said inner surface rapidly to 770-820° C.; then pouring said inner layer at a pouring rate of 5-12 seconds for each brake drum at a pouring temperature of 1410-1445° C. while keeping the rotating speed of said centrifuge at 550-600 rpm; during the pouring of molten iron in said inner layer, adding SiC of 250-300 meshes along with the molten iron stream at an amount accounting for 3.8-4.3% by mass fraction of the molten iron entering a casting mould; and during the centrifugal pouring of the molten iron, adding an electromagnetic field with a magnetic field strength of 0.15-0.25 T; turning off said electromagnetic field 1 minute after all the molten iron enters the casting mould; then raising the rotating speed of said centrifuge to 1050-1100 rpm, and cooling the outer ductile iron shell by spraying; after the molten iron is completely solidified, reducing the rotating speed of said centrifuge to 100-120 rpm, and bringing the temperature down to 500-580° C., stopping spray cooling and shutting down to take out the casting, which is finished to obtain the high-strength and high-thermal conductivity new material composite brake drum.

Optionally, in step 1), the thickness of a sand shell used for casting the outer layer is 8.0-12.0 mm, the sand shell is composed of, by mass fraction, 40-50% of 150-180-mesh quartz sand, 25-30% of 200-250-mesh quartz sand and 25-30% of 280-330-mesh quartz sand; the combined sand shell is laid at the bottom of a sand box; a liquid inlet of the sand outer shell is inserted into a pouring cup after placing a filter screen on said liquid inlet, and a cover plate is placed above the pouring cup to prevent iron particles from falling into the pouring cup when they are added; all voids except the cavities are filled with iron particles of φ3 mm-φ6 mm and vibrated and compacted, and the covering height of iron particles is not lower than 100-500 mm above the upper plane of the sand shell.

Optionally, the outer layer is made of high-strength ductile iron which is grade T450-10 or above.

Optionally, in step 1), grade QT500-7 or QT600-3 is used for smelting molten iron.

Optionally, in step 1), when molten iron is smelted, the chemical composition of the molten iron in the furnace is controlled at, in percentage by weight: C 3.5-3.9%; Si 1.0-1.5%; Mn≤0.8%; S≤0.03%.

Optionally, in step 2), the inner layer is made of low-alloy gray cast iron, and the chemical composition of the molten iron as well as mass fractions thereof are controlled at: 3.21-3.75% C, 1.30-2.14% Si, 0.52-1.09% Mn, 0.21-0.48% Cr, ≤0.10% S, ≤0.06% P, the balance Fe, 3.9%≤carbon equivalent (C+1/3Si)≤4.3%.

Optionally, when the outer layer is made of vermicular iron, RuT450 or RuT500 is used.

The present disclosure achieves the following technical effects:

1) With respect to the composite brake drum of the present disclosure, the outer layer of ductile iron is well bonded with the inner layer of gray cast iron, and the strength of the bonding layer exceeds the strength of the inner layer of gray cast iron.

2) The bonding layer of the composite brake drum of the present disclosure has good thermal conductivity, and the coefficient of thermal conductivity of the bonding layer is higher than that of the outer layer of ductile iron and comparable to that of the inner layer of gray cast iron, overcoming the disadvantage of the composite brake drum with an ordinary outer layer of low-carbon steel plate whose bonding interface has large thermal resistance and poor thermal conduction property that may cause easy crack of the composite brake drum during use.

3) With respect to the brake drum of the present disclosure, the strength of the outer layer of ductile iron is over 500/600 MPa, and the inner layer of gray cast iron has excellent thermal conductivity with a coefficient of thermal conductivity of greater than 65 W/m·K at 300° C.

4) An electromagnetic interference technology is innovatively employed in the solidification process of the inner layer of gray iron in the present disclosure, by which the graphite tip of the solidified gray iron is rounded and blunt, thus delaying the generation of cracking on the braking surface and improving the thermal fatigue resistance performance of the gray iron.

5) The working face of the inner layer of gray cast iron in the composite brake drum of the present disclosure has significantly improved wear resistance due to the enrichment of high hardness SiC.

6) The service life of the composite brake drum of the present disclosure is improved by over 4.3 times relative to that of the bimetallic composite brake drum with an ordinary outer layer of low-carbon steel plate.

7) With respect to the composite brake drum of the present disclosure, because the strength of the outer layer of ductile iron is over 1.3-1.56 times higher than that of the low-carbon steel plate, and the specific gravity of ductile iron is only 90% that of the steel plate, the weight of the same type of product may be reduced by about 10%, which has great significance for the light-weighting of vehicles.

In summary, the promotion and application of the present disclosure will have good economic and social benefits.

BRIEF DESCRIPTION OF THE DRAWINGS

In order to illustrate the technical solutions in the embodiments of the present disclosure more clearly, the following is a brief description of the accompanying drawings that need to be used in the embodiments. It is apparent that the following drawings are only some embodiments of the present disclosure, and other drawings can be obtained without creative effort by any person with ordinary skills in the art based on these drawings.

Figure 1:
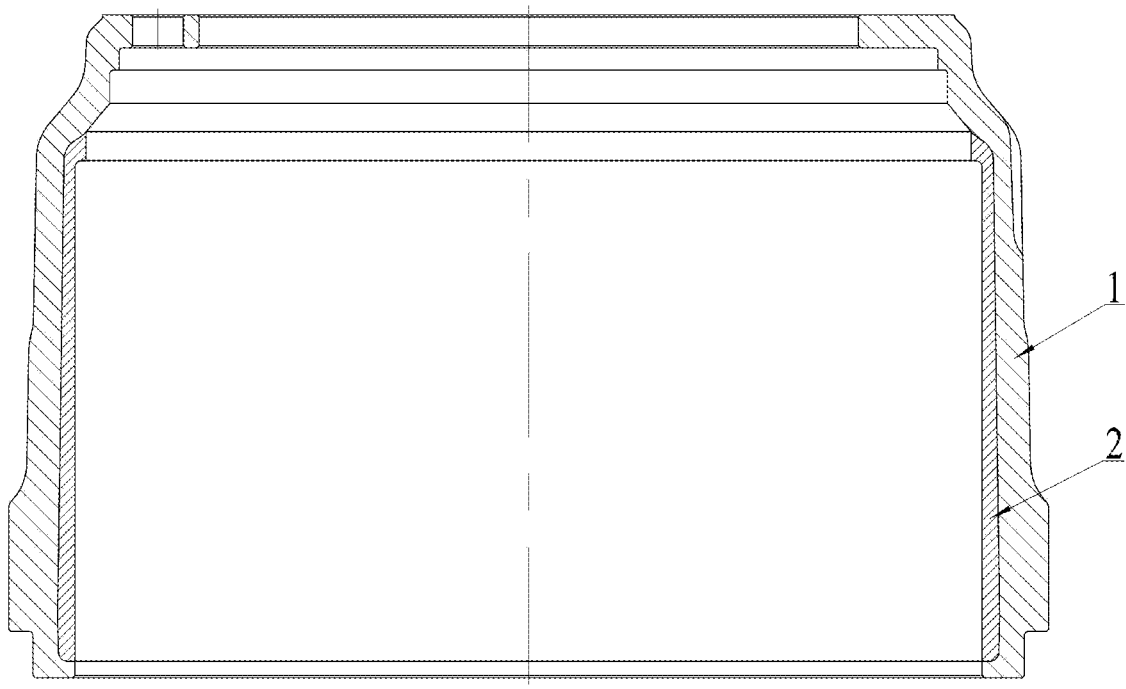
FIG. 1 is a structural schematic diagram of the high-strength and high-thermal conductivity new material composite brake drum of the present disclosure.

Illustrative features are assigned the following reference numerals: 1, outer layer; 2, inner layer; 3, outer shell; 4, inner shell; 5, bottom; 6, flange hole.

DETAILED DESCRIPTION

The embodiments of the present disclosure will be clearly and completely described below in conjunction with the accompanying drawings in embodiments of the present disclosure. Obviously, the described embodiments are only a part of embodiments of the present disclosure, not all of them. Based on embodiments of the present disclosure, all other embodiments obtained by a person with ordinary skills in the art without creative labor fall within the protection scope of the present disclosure.

Embodiment 1

As shown in FIGS. 1 to 4, this embodiment provides a high-strength and high-thermal conductivity new material composite brake drum and a preparation method thereof. The high-strength and high-thermal conductivity new material composite brake drum include an outer layer 1 and an inner layer 2, the outer layer 1 is made of high-strength ductile iron, the inner layer 2 is made of low-alloy gray cast iron, and the outer layer 1 and the inner layer 2 are fused together by means of solid-liquid bonding; the specific preparation method is as below:

1) Production of the high-strength ductile iron outer layer 1

Figure 2:
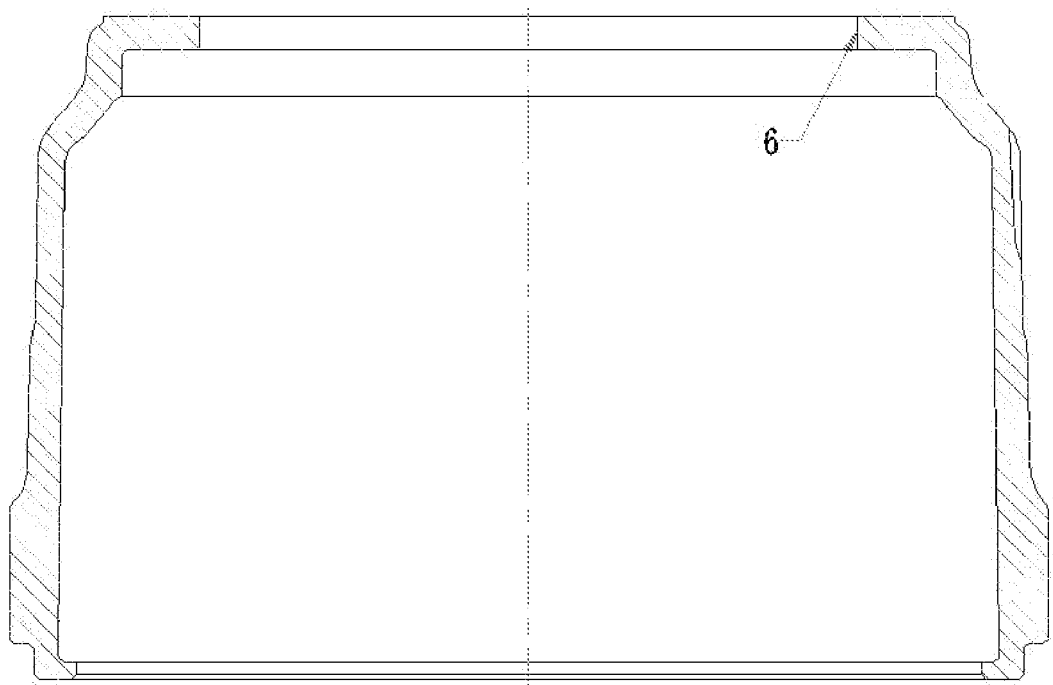
FIG. 2 is a structural diagram of the high-strength ductile iron outer shell of the high-strength and high-thermal conductivity new material composite brake drum of the present disclosure.
Figure 3:
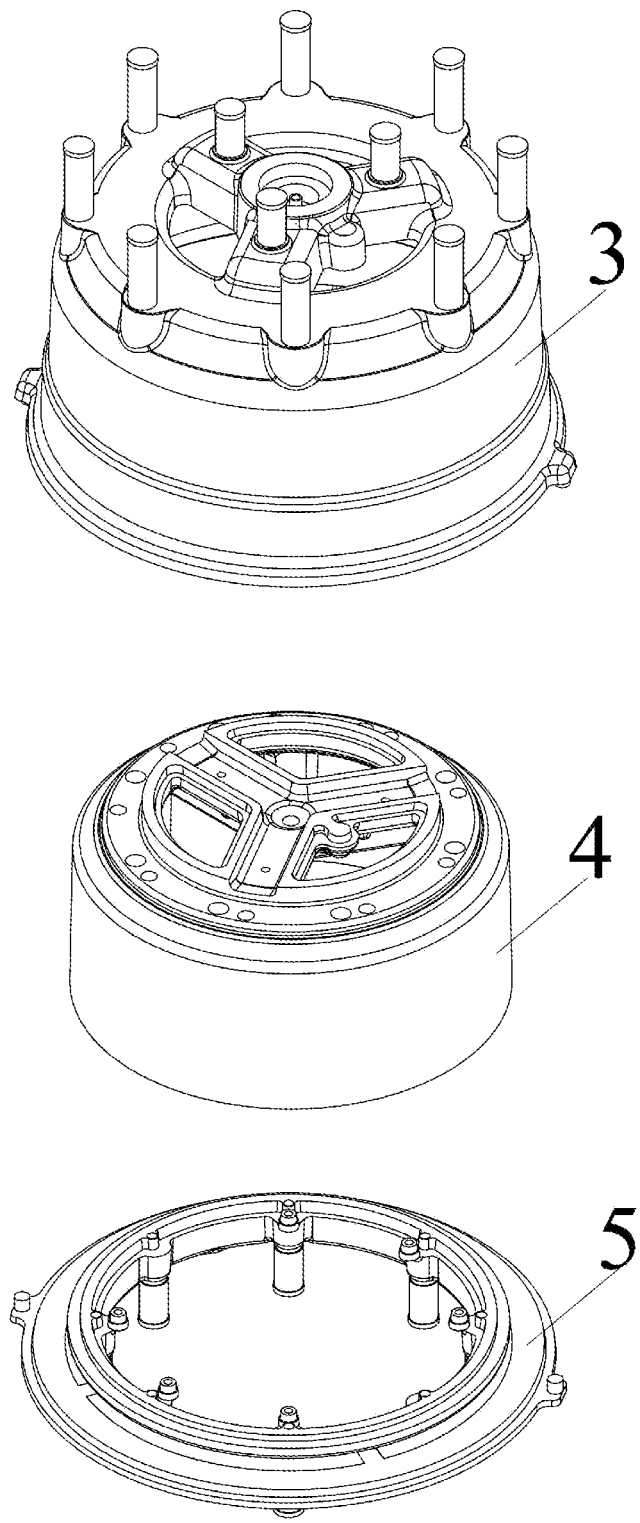
FIG. 3 is a schematic diagram showing the assembling process of the sand shell of the high-strength and high-thermal conductivity new material composite brake drum of the present disclosure.
Figure 4:
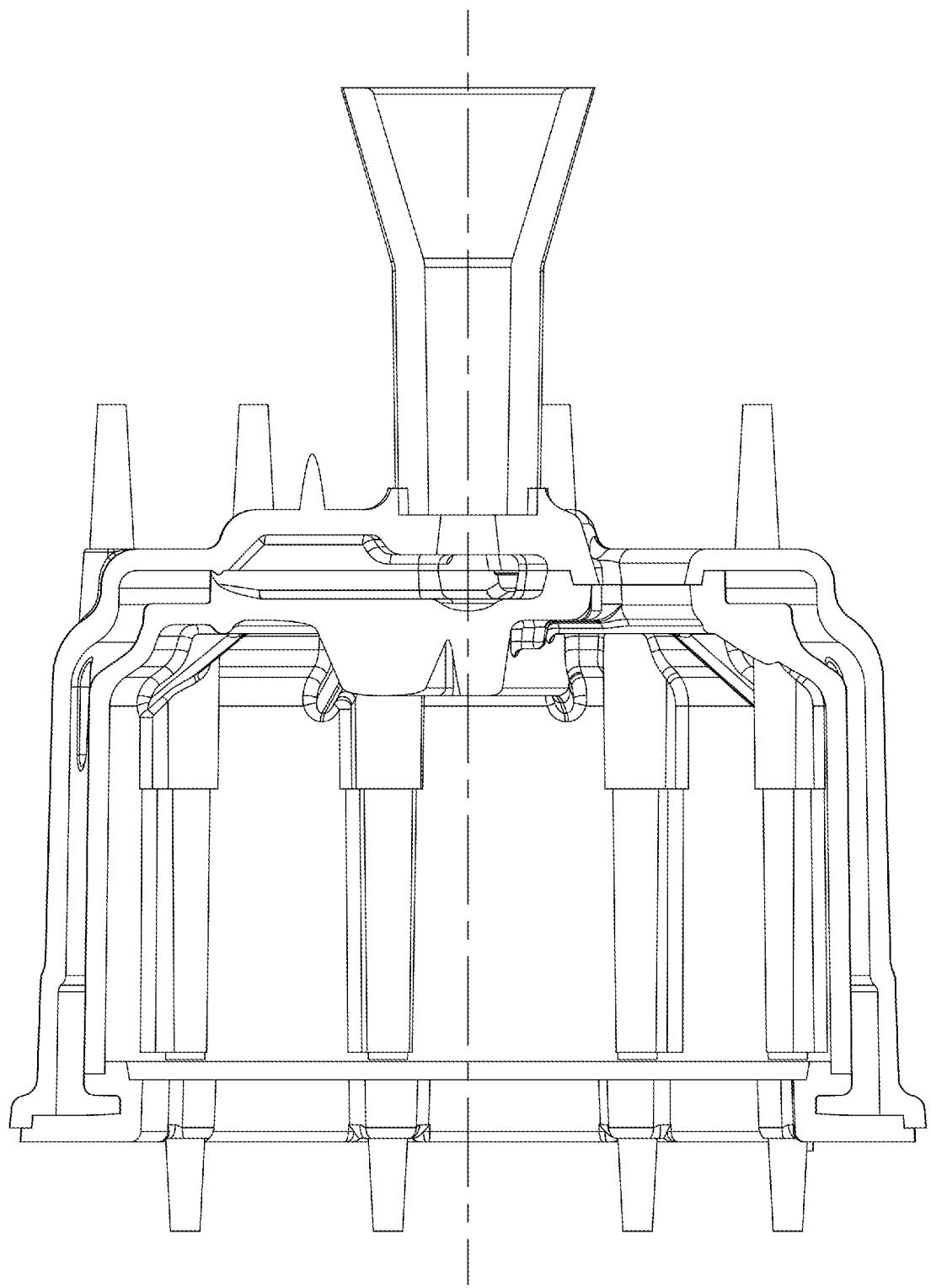
FIG. 4 is a schematic diagram showing the cavity formed by the outer shell of the high-strength and high-thermal conductivity new material composite brake drum of the present disclosure.

The structure of the high-strength ductile iron outer layer 1 is shown in FIG. 2.

The thickness of the sand shell is 8.0-12.0 mm, and the sand shell is composed of, by mass fraction, 40-50% of 150-180-mesh quartz sand, 25-30% of 200-250-mesh quartz sand and 25-30% of 280-330-mesh quartz sand. The combined sand shell is laid at the bottom 5 of a sand box. A liquid inlet of the sand outer shell 3 is inserted into a pouring cup after placing a filter screen on the liquid inlet, and a cover plate is placed above the pouring cup to prevent iron particles from falling into the pouring cup when they are added. All voids except the cavities are filled with iron particles of φ3 mm-φ6 mm and vibrated and compacted, and the covering height of iron particles is not lower than 100-500 mm above the upper plane of the sand shell.

Molten iron is smelted, during which the chemical composition of the molten iron in the furnace is controlled at, in percentage by weight: C 3.5-3.9%; Si 1.0-1.5%; Mn≤0.8%;

S≤0.03%. After the molten iron is melted, 1-1.5% by weight of rare-earth ferrosilicon magnesium spheroidizing agent and 0.8-1.3% by weight of ferrosilicon inoculant are added at the bottom of a ductile iron ladle for spheroidization while keeping the spheroidization temperature at 1560-1650° C.

The spheroidized molten iron is poured into cavities from a pouring cup at a pouring rate of 15-25 seconds for each cavity while controlling the pouring temperature at 1420-1480° C. for a total pouring period of <15 minutes. After the molten iron is completely solidified and when the temperature drops to 950-1000° C., it is taken out of the cavities and cooled in air to a temperature of 280-360° C., degated, and ground to clean the sand to obtain a high-strength ductile iron outer casting of the composite brake drum.

2) Solid-liquid organic fusion between the inner wall of the ductile iron shell of the outer layer 1 and gray cast iron The flange hole 6 in FIG. 2 is machined to the specified size for the positioning of centrifugal casting.

The ductile iron outer layer 1 is placed on a centrifuge, and a compounding agent is added to the part of the inner surface that needs to be compounded with gray iron. The compounding agent is composed of sodium carbonate, potassium carbonate, sodium fluoride, sodium chloride, cryolite and calcium chloride. The inner surface is heated rapidly to 770-820° C. Then the inner layer is poured with gray cast iron. The chemical composition of the molten iron of gray cast iron of the inner layer 2 as well as mass fractions thereof are controlled at 3.21-3.75% C, 1.30-2.14% Si, 0.52-1.09% Mn, 0.21-0.48% Cr, ≤0.10% S, ≤0.06% P, the balance Fe, 3.9%≤carbon equivalent (C+1/3Si)≤4.3%. The pouring rate is 5-12 seconds for each brake drum, the pouring temperature is 1410-1445° C., and the rotating speed of the centrifuge is 550-600 rpm. During the pouring of the molten iron of gray cast iron of the inner layer 2, SiC of 250-300 meshes is added along with the stream of molten iron at an amount accounting for 3.8-4.3% by mass fraction of the molten iron entering the casting mould. In addition, during the centrifugal pouring of the molten iron of gray cast iron, an electromagnetic field with a magnetic field strength of 0.15-0.25 T is added. The electromagnetic field is turned off 1 minute after all the molten iron of gray cast iron enters the casting mould. The rotating speed of the centrifuge is then raised to 1050-1100 rpm, and the ductile iron shell of the outer layer 1 is cooled by spraying. After the molten iron is completely solidified, the rotating speed of the centrifuge is dropped to 100-120 rpm. When the temperature drops to 500-580° C., the spray cooling is stopped and the centrifuge is shut down to take out the casting, which is finished to obtain the high-strength and high-thermal conductivity new material composite brake drum.

With respect to the high-strength and high-thermal conductivity new material composite brake drum of the present disclosure, the outer layer 1 is made of high-strength ductile iron, the inner layer 2 is made of gray iron with high-thermal conductivity and resistant to thermal fatigue. During the pouring of the molten iron of gray cast iron of the inner layer 2, SiC of 250-300 meshes is added along with the stream of molten iron at an amount accounting for 3.8-4.3% by mass fraction of the molten iron entering the casting mould. Silicon carbide is formed by high temperature smelting of quartz sand, petroleum coke (or coal coke), wood shavings and other raw materials in resistance furnaces. Silicon carbide has a melting point of 2700° C., a specific gravity of 3.2 g/cm$^3$, and a microhardness of 2840-3320 kg/mm$^2$, that is, having characteristics of high hardness, low density, and high melting point, etc.

Therefore, it will not be dissolved when added into the molten iron of gray cast iron. Its high hardness may significantly improve the wear resistance of the cast iron. In particular, the density of silicon carbide is obviously lower than the density of Fe (7.8 g/cm3), so under the action of centrifugal force, silicon carbide will be enriched on the inner surface of the composite brake drum, that is the working face of the composite brake drum, thereby significantly improving the hardness and wear resistance of the inner surface.

The outer layer 1 of the composite brake drum is produced by filling a coated sand shell with iron particles, and pouring spheroidized molten iron into a casting mould of the sand shell. Due to the fast solidification and cooling of the iron particle-filled coated sand shell, the obtained casting has the characteristics of fine and dense organization structures, thus ensuring the high strength and high toughness of the ductile iron of the outer layer 1. The coated sand shell of the high-strength ductile iron outer layer 1 consists of three parts: an outer shell 3, an inner shell 4 and a bottom 5, as in FIG. 3. Three sand shells are combined into one to form the cavity of the high-strength ductile iron outer shell 3. A gate is located at the top, which can maximally improve the process yield and the feeding effect, as in FIG. 4.

During the centrifugal pouring of the molten iron of gray cast iron, an electromagnetic field with a magnetic field strength of 0.15-0.25 T is added. The electromagnetic field added during the centrifugal pouring of the molten iron of gray cast iron will generate an electromagnetic force, which may cause the tip of the flake graphite precipitated during solidification to become rounded and blunt, thus preventing the working face from cracking during the use of the brake drum, and at the same time having a significant effect on improving the thermal fatigue resistance performance. The electromagnetic field is turned off 1 minute after all the molten iron of gray cast iron enters the casting mould, and the rotating speed of the centrifuge is then raised to 1050-1100 rpm, which is mainly aimed to promote the low-density silicon carbide to be enriched on the inner surface of the composite brake drum, thereby improving the wear resistance of the brake drum. At the same time, the ductile iron shell of the outer layer 1 is cooled by spraying so as to prevent the strength of the ductile iron shell of the outer layer 1 from decreasing. After the molten iron is completely solidified, the rotating speed of the centrifuge is dropped to 100-120 rpm, the temperature is dropped to 500-580° C., the spray cooling is stopped and the centrifuge is shut down to take out the casting, which is finished to obtain the composite brake drum having excellent comprehensive performance.

Embodiment 2

The outer layer 1 is made of high-strength ductile iron which is a grade of QT450-10 or above, preferably QT500-7 or QT600-3.

Embodiment 3

The outer layer 1 is made of vermicular iron of grade RuT450 or RuT500.

It should be noted that it is apparent to those skilled in the art that the present disclosure is not limited to the details of the exemplary embodiments described above and that it can be realized in other specific forms without departing from the spirit or essential features of the present disclosure. Therefore, from every point of view, the embodiments should be regarded as exemplary rather than restrictive. The scope of the present disclosure is defined by the attached claims but not limited by the above description. Therefore, it is intended to encompass all variations falling within the meaning and scope of the equivalent elements of the claims within the present disclosure, and any reference numerals in the claims should not be considered to limit the claim involved.

The principle and implementation of the present disclosure are illustrated by specific embodiments in the specification. The above description of embodiments is only for the purpose of assisting in understanding the method and core ideas of the present disclosure. At the same time, for persons with ordinary skills in the art, there will be variations in the specific implementation and application scope based on the ideas of the present disclosure. In summary, the contents of this specification should not be considered as the limitation of the present disclosure.

What is claimed is:

1. A method for preparing a high-strength and high-thermal conductivity new material composite brake drum, wherein, the high-strength and high-thermal conductivity new material composite brake drum comprises an outer layer and an inner layer, the outer layer is made of high-strength ductile iron, the inner layer is made of low-alloy gray cast iron, and the outer layer and the inner layer are fused together by means of solid-liquid bonding, the preparation method is as below:
   1) Smelting molten iron, and after the molten iron is melted, adding 1-1.5% by weight of rare-earth ferrosilicon magnesium spheroidizing agent and 0.8-1.3% by weight of ferrosilicon inoculant at a bottom of a ductile iron ladle for spheroidization while keeping the spheroidization temperature at 1560-1650° C.;
   pouring the spheroidized molten iron into cavities from a pouring cup at a pouring rate of 15-25 seconds for each cavity while controlling the pouring temperature at 1420-1480° C. for a total pouring period of ≤15 minutes; after the molten iron is completely solidified and when the temperature drops to 950-1000° C., taking it out of the cavities and cooling in air to a temperature of 280-360° C., degating, grinding and cleaning sand to obtain a high-strength ductile iron outer casting of the composite brake drum;
   2) Placing the outer casting on a centrifuge, adding a compounding agent to a part of an inner surface that needs to be compounded with gray iron, heating the inner surface rapidly to 770-820° C.; then pouring the inner layer at a pouring rate of 5-12 seconds for each brake drum at a pouring temperature of 1410-1445° C. while keeping the rotating speed of the centrifuge at 550-600 rpm; during the pouring of molten iron in the inner layer, adding SiC of 250-300 meshes along with the molten iron stream at an amount accounting for 3.8-4.3% by mass fraction of the molten iron entering the outer casting; and during the centrifugal pouring of the molten iron, adding an electromagnetic field with a magnetic field strength of 0.15-0.25 T; turning off the electromagnetic field 1 minute after all the molten iron enters the outer casting; then raising the rotating speed of the centrifuge to 1050-1100 rpm, and cooling a shell of the outer casting by spraying; after the molten iron is completely solidified, reducing the rotating speed of the centrifuge to 100-120 rpm, and bringing the temperature down to 500-580° C., stopping spray cooling and shutting down to take out the outer casting and the solidified inner layer, which is finished to obtain the high-strength and high-thermal conductivity new material composite brake drum;
   wherein, in step 2), the inner layer is made of low-alloy gray cast iron, and the chemical composition of the molten iron as well as mass fractions thereof are controlled at: 3.21-3.75% C, 1.30-2.14% Si, 0.52-1.09% Mn, 0.21-0.48% Cr, ≤0.10% S, ≤0.06% P, the balance Fe.

2. The method according to claim 1, wherein, in step 1), a thickness of a sand shell used for casting the outer layer is 8.0-12.0 mm, the sand shell is composed of, by mass fraction, 40-50% of 150-180-mesh quartz sand, 25-30% of 200-250-mesh quartz sand and 25-30% of 280-330-mesh quartz sand; the combined sand shell is laid at a bottom of a sand box; a liquid inlet of the sand outer shell is inserted into a pouring cup after placing a filter screen on the liquid inlet, and a cover plate is placed above the pouring cup to prevent iron particles from falling into the pouring cup when they are added; all voids except the cavities are filled with iron particles of φ3 mm-φ6 mm and vibrated and compacted, and a covering height of iron particles is not lower than 100-500 mm above upper plane of the sand shell.

3. The method according to claim 1, wherein, the outer layer is made of high-strength ductile iron which is grade QT450-10 or above.

4. The method according to claim 1, wherein, in step 1), grade QT500-7 or QT600-3 is used for smelting molten iron.

5. The method according to claim 1, wherein, in step 1), when molten iron is smelted, the chemical composition of the molten iron in a furnace is controlled at, in percentage by weight: C 3.5-3.9%; Si 1.0-1.5%; Mn≤0.8%; S≤0.03%.

6. The method according to claim 3, wherein, in step 1), grade QT500-7 or QT600-3 is used for smelting molten iron.

7. A method for preparing a composite brake drum, wherein the composite brake drum comprises an outer layer and an inner layer, the outer layer is made of high-strength ductile iron, the inner layer is made of low-alloy gray cast iron, and the outer layer and the inner layer are fused together by solid-liquid bonding, the method comprising:
   1) Melting high-strength ductile iron;
   after the molten iron is melted, adding 1-1.5% by weight of rare-earth ferrosilicon magnesium spheroidizing agent and 0.8-1.3% by weight of ferrosilicon inoculant at a bottom of a ladle for spheroidization while keeping A spheroidization temperature at 1560-1650° C. to obtain spheroidized molten iron;
   pouring the spheroidized molten iron into cavities from a pouring cup at a pouring rate of 15-25 seconds for each cavity while controlling the pouring temperature at 1420-1480° C. for a total pouring period of ≤15 minutes;
   after the spheroidized molten iron is completely solidified and the temperature drops to 950-1000° C., taking the solidified iron out of the cavities and cooling in air to a temperature of 280-360° C. to obtain the high-strength ductile iron outer layer of the composite brake drum;
   2) Placing the outer layer on a centrifuge, adding a compounding agent to a part of an inner surface of the outer layer, heating the inner surface to 770-820° C., then pouring low-alloy molten gray iron along the inner surface at a pouring rate of 5-12 seconds at a pouring temperature of 1410-1445° C. while keeping a rotating speed of the centrifuge at 550-600 rpm;
   during the pouring of the molten gray iron, adding SiC of 250-300 mesh along with the molten iron stream at an amount accounting for 3.8-4.3% by mass fraction of the molten gray iron;

during the pouring of the molten gray iron, adding an electromagnetic field with a magnetic field strength of 0.15-0.25 T;

turning off the electromagnetic field 1 minute after all the molten gray iron is poured;

then raising the rotating speed of the centrifuge to 1050-1100 rpm, and cooling the outer casting by spraying;

after the molten gray iron is completely solidified, reducing the rotating speed of the centrifuge to 100-120 rpm, bringing the temperature down to 500-580° C., stopping spray cooling, and taking the outer layer and the solidified inner layer off the centrifuge to obtain the composite brake drum;

wherein the chemical composition of the low-alloy molten gray iron as well as mass fractions thereof are controlled at: 3.21-3.75% C, 1.30-2.14% Si, 0.52-1.09% Mn, 0.21-0.48% Cr, ≤0.10% S, ≤0.06% P, the balance Fe.

\* \* \* \* \*